United States Patent
Bhaskaran et al.

(10) Patent No.: US 8,904,486 B2
(45) Date of Patent: Dec. 2, 2014

(54) METHOD AND SYSTEM FOR AUTONOMIC SECURITY CONFIGURATION

(75) Inventors: Kumar Bhaskaran, Englewood Cliffs, NJ (US); Tian Chao, Bedford, NY (US); Rainer Kerth, Carmel, NY (US); Frederick Y. Wu, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 10/908,626

(22) Filed: May 19, 2005

(65) Prior Publication Data

US 2006/0265739 A1   Nov. 23, 2006

(51) Int. Cl.
*G06F 17/30* (2006.01)
*H04L 29/06* (2006.01)
*H04L 12/24* (2006.01)

(52) U.S. Cl.
CPC ............ *H04L 41/0886* (2013.01); *H04L 41/22* (2013.01); *H04L 41/0843* (2013.01); *H04L 63/20* (2013.01); *H04L 41/0803* (2013.01)
USPC ............. 726/4; 726/1; 726/2; 726/6; 726/14; 713/166; 713/182

(58) Field of Classification Search
CPC ...... H04L 41/22; H04L 41/0803; H04L 63/20
USPC ........................................ 726/4, 1
See application file for complete search history.

(56) References Cited

U.S. PATENT DOCUMENTS

| | | | |
|---|---|---|---|
| 6,366,916 B1 * | 4/2002 | Baer et al. ........................ 707/10 |
| 6,678,827 B1 * | 1/2004 | Rothermel et al. ............... 726/6 |
| 6,738,908 B1 * | 5/2004 | Bonn et al. ......................... 726/4 |
| 7,032,022 B1 * | 4/2006 | Shanumgam et al. ........ 709/225 |
| 7,197,764 B2 * | 3/2007 | Cichowlas ........................ 726/6 |
| 2003/0037040 A1 * | 2/2003 | Beadles et al. .................... 707/1 |
| 2003/0058277 A1 * | 3/2003 | Bowman-Amuah ........... 345/765 |
| 2003/0154404 A1 * | 8/2003 | Beadles et al. ................ 713/201 |
| 2004/0181690 A1 * | 9/2004 | Rothermel et al. ............ 713/201 |
| 2005/0027851 A1 | 2/2005 | McKeown et al. |
| 2005/0273851 A1 * | 12/2005 | Raju Datla et al. ............. 726/14 |
| 2006/0212376 A1 * | 9/2006 | Snyder et al. ................... 705/35 |
| 2006/0235732 A1 * | 10/2006 | Miller et al. ..................... 705/7 |
| 2007/0204154 A1 * | 8/2007 | Swander et al. .............. 713/166 |

OTHER PUBLICATIONS

Grace et al, A Reflective Framework for Discovery and Interaction in Hetergeneous Mobile Environments, Mobile Computing and Communications Review, vol. 9, No. 1, pp. 2-14.*
Schuba et al, Integrated Network Service Processing Using Programmable Network Devices, May 2005, Sun Microsystems, pp. 1-27.*
Office Action from corresponding Chinese Patent Application No. 2006100577546 dated Jun. 12, 2009.

* cited by examiner

*Primary Examiner* — Luu Pham
*Assistant Examiner* — Jenise Jackson
(74) *Attorney, Agent, or Firm* — Charles L. Moore; Moore & Van Allen PLLC

(57) ABSTRACT

A method, system and computer program product for autonomic security configuration may include controlling a security configuration of at least one resource forming a solution based on a plurality of security requirements. The method may further include applying the plurality of security requirements across a plurality of resources independent of a resource type.

17 Claims, 10 Drawing Sheets

METHOD AND SYSTEM FOR AUTONOMIC SECURITY CONFIGURATION

BACKGROUND OF THE INVENTION

The present invention relates to security over a network and accessing systems, and more particularly to a method and system for autonomic security configuration of resources forming a solution, such as a business solution or the like.

To support operations, an organization or enterprise may have data processing systems with a variety of diverse products and applications from different vendors. A product or application may be referred to herein as a resource. A resource may be either an internal application or an external business partner resource or the like. A service provider can provide one or more resources. In addition to individual resources, an enterprise or organization may need to maintain business solutions. A business solution may be an ensemble of deployable resources to address a specific business problem or perform a specific operation.

Another set of resources may be those that provide security services, such as authentication, authorization, identity management, non-repudiation and the similar services. Examples of such resources may include Web proxy servers, Web servers, application servers, products that provide access control and similar devices or systems.

Each resource may have its own method and technology to configure security. The method may be complex and the mechanics of configuring the security may change from one release to another. Accordingly, keeping track of the different configuration methods and technologies and mastering the skills to configure security for each resource can be burdensome. Even more challenging may be to ensure that the security configured for the various resources that form a business solution work in a coherent way without conflicts and that the configuration defined for each resource does not change unintentionally in such a way that causes security inconsistency within the solution over time for some reason, such as manual updates by an administrator, a new release, or version of software.

BRIEF SUMMARY OF THE INVENTION

In accordance with an embodiment of the present invention, a method for autonomic security configuration may include controlling a security configuration of at least one resource forming a solution based on a plurality of security requirements. The method may also include applying the plurality of security requirements across a plurality of resources independent of any differences in configuring resource security between diverse resources.

In accordance with another embodiment of the present invention, a system for autonomic security configuration may include a processor. The system may also include a security specification and configuration tool operable on the processor to control security configuration of at least one resource forming a solution based on a plurality of security requirements and to apply the plurality of security requirements across a plurality of resources independent of any differences in configuring resource security between diverse resources.

In accordance with another embodiment of the present invention, a computer program product for autonomic security configuration may include a computer readable medium having computer readable program code embodied therein. The computer readable medium may include computer readable program code configured to control a security configuration of at least one resource forming a solution based on a plurality of security requirements. The computer readable medium may also include computer readable program code configured to apply the plurality of security requirements across a plurality of resources independent any differences in configuring resource security between diverse resources.

In accordance with another embodiment of the present invention, the system for autonomic security configuration may include a set of security templates. The set of security templates may include a process security template, a message security template and transport security template. The templates may be applied in a top-down fashion in a predetermined order with constraints enforced in a similar fashion. For example, in a top level or solution level, the process security template may define default security settings for the next two levels below, i.e., the message security and transport security levels or templates, when no specific templates are applied for these two levels. If a template is applied at the message level, the template may dictate or define the security at the transport level as well. In addition, each lower level may only be more restrictive than the level above.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
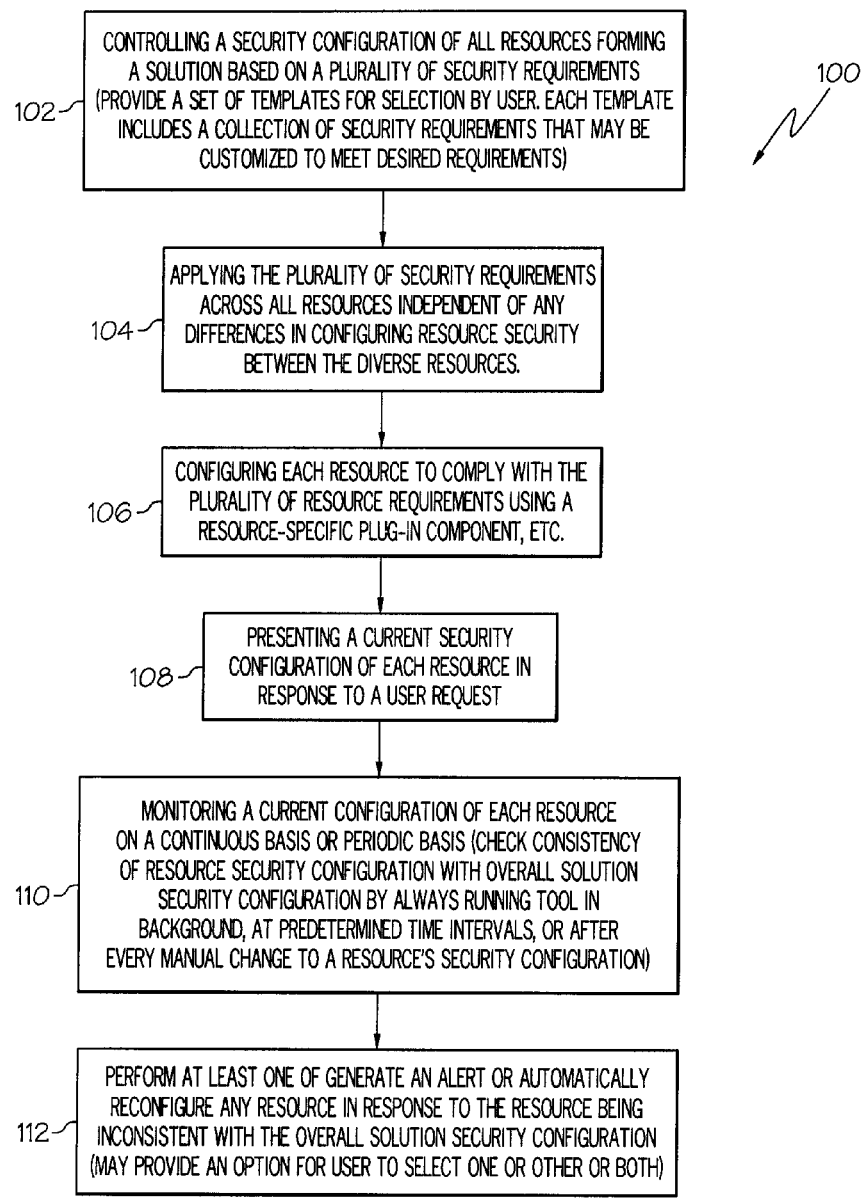
FIG. 1 is a flow chart of an example of a method for autonomic security configuration in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for autonomic security configuration in accordance with an embodiment of the present invention. In block 102, a security configuration of all resources forming a solution, such as a business solution or the like, may be controlled based on a plurality of security requirements. The security configuration of the resources may be controlled by a computer system or systems running a security specification and configuration tool, as described herein in accordance with an embodiment of the present invention. The security specification and configuration tool may provide a set of templates or the like that may be selected by a user according to the security requirements of a solution or system. Each template may include a collection of predefined security requirements that may be customized by the user to meet desired security requirements.

In block 104, the plurality of security requirements in the selected template may be applied across all resources forming a solution. The security requirements may be applied independent of any differences in configuring security between the different resources. A resource-specific plug-in component or the like may be associated with each resource to configure the resource to comply with the plurality of resource requirements. Accordingly, the user can input or select security requirements in a declarative manner and specify what security is required or desired by selecting a template and customizing the security requirements without having to know how such security may be implemented in each resource.

In block 106, each resource may be configured to comply with the plurality of resources requirements using the resource-specific plug-in or similar means as previously discussed.

In block 108, a current security configuration of each resource may be presented at any time in response to a request from the user. The current security configuration may be presented on a monitor of a client computer system or the like. The security configuration may be similar to the GUI 400 illustrated in FIG. 4 for specifying or defining the details of a security template. The status of the security features or elements presented may include confidentiality, data integrity, non-repudiation, authentication, authorization or similar elements or features related to security. The GUI for displaying the current security configuration may also include features such as buttons or drop-down lists or menus for modifying or reconfiguring the security of an associated resource.

In block 110, a current configuration for each resource may be monitored on a continuous or periodic basis. For example, consistency of the security configuration of each resource may be checked or compared with the overall security configuration for the solution. The consistency may be checked or compared continuously by running the security specification and configuration tool in a background mode, at predetermined time intervals or after every manual change to a resource's security configuration. A user may also be able to select as an option built into the tool which type of monitoring or consistency check may be desired.

In block 112, at least one of generating an alert or automatically reconfiguring any resource may be performed in response to the security configuration of the resource being inconsistent with the overall security configuration of the solution in block 110. An option may be provided in the security specification and configuration tool for a user to select one of both generating an alert and reconfiguring the resource to be consistent with the overall solution security configuration. For example, an alert may be generated with a description of the inconsistency. A user may then select to reconfigure the security of the resource, if the inconsistency warrants reconfiguration of the resource security to be consistent with the overall solution security configuration.

Figure 2A:
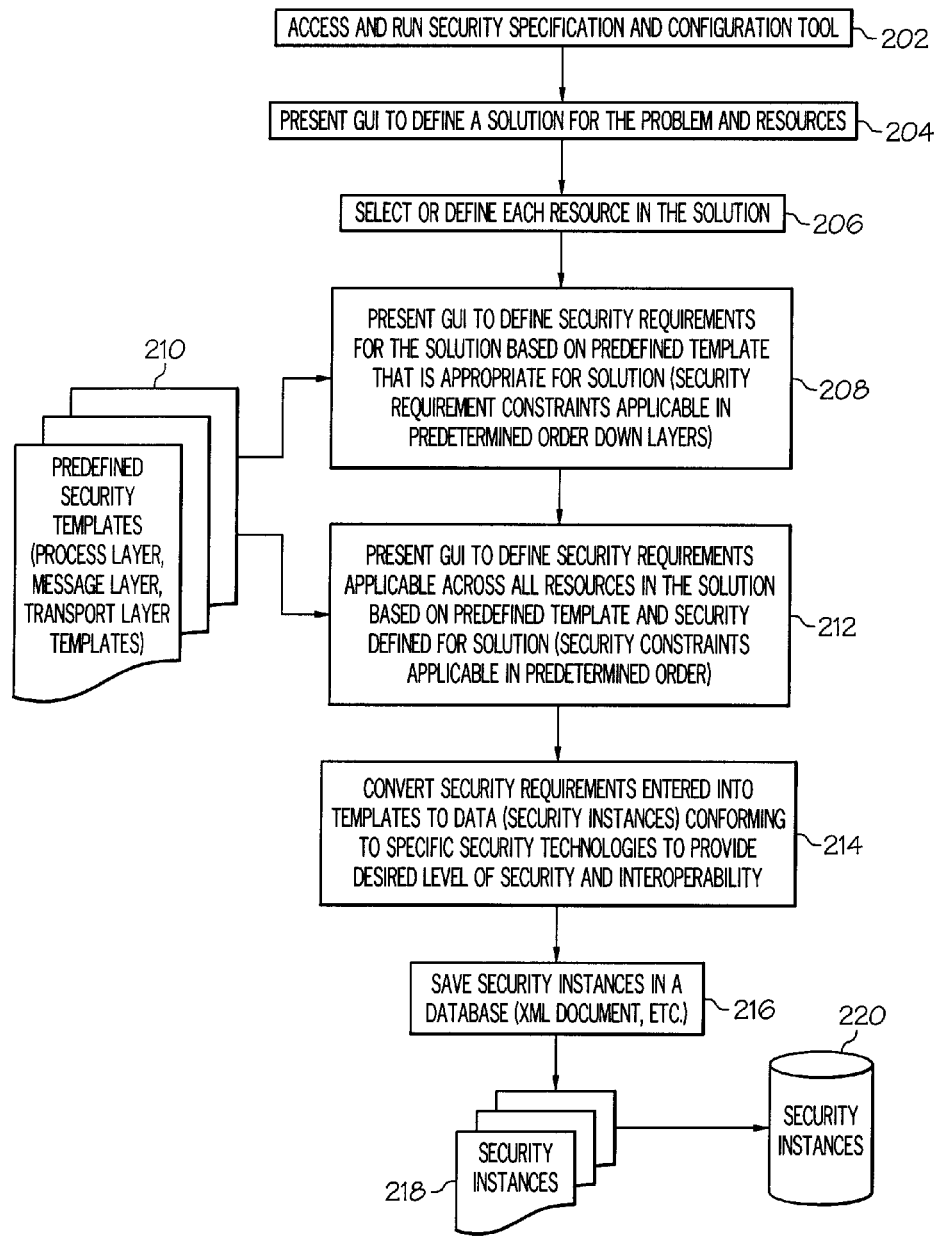
FIGS. 2A, 2B and 2C (collectively FIG. 2) are a flow chart of an example of a method for autonomic security configuration in accordance with another embodiment of the present invention.
Figure 2B:
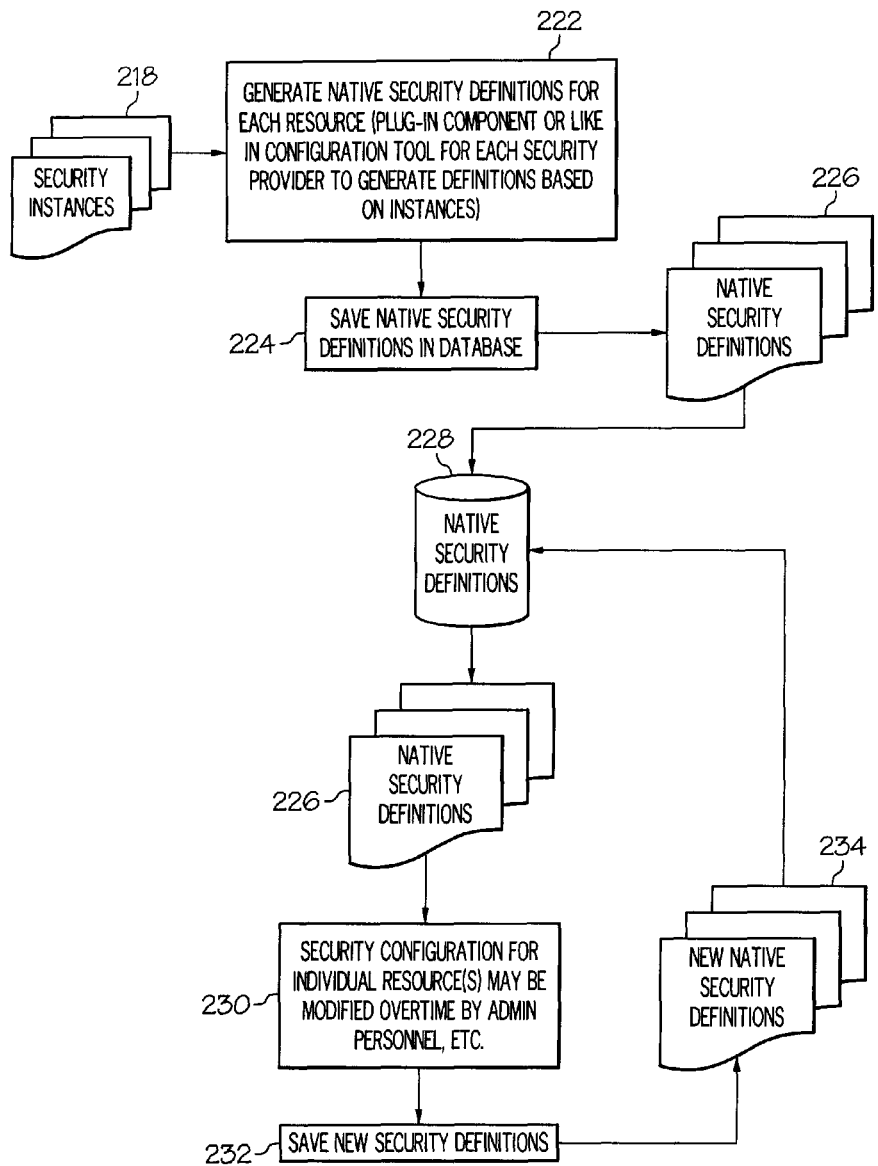
Figure 2C:
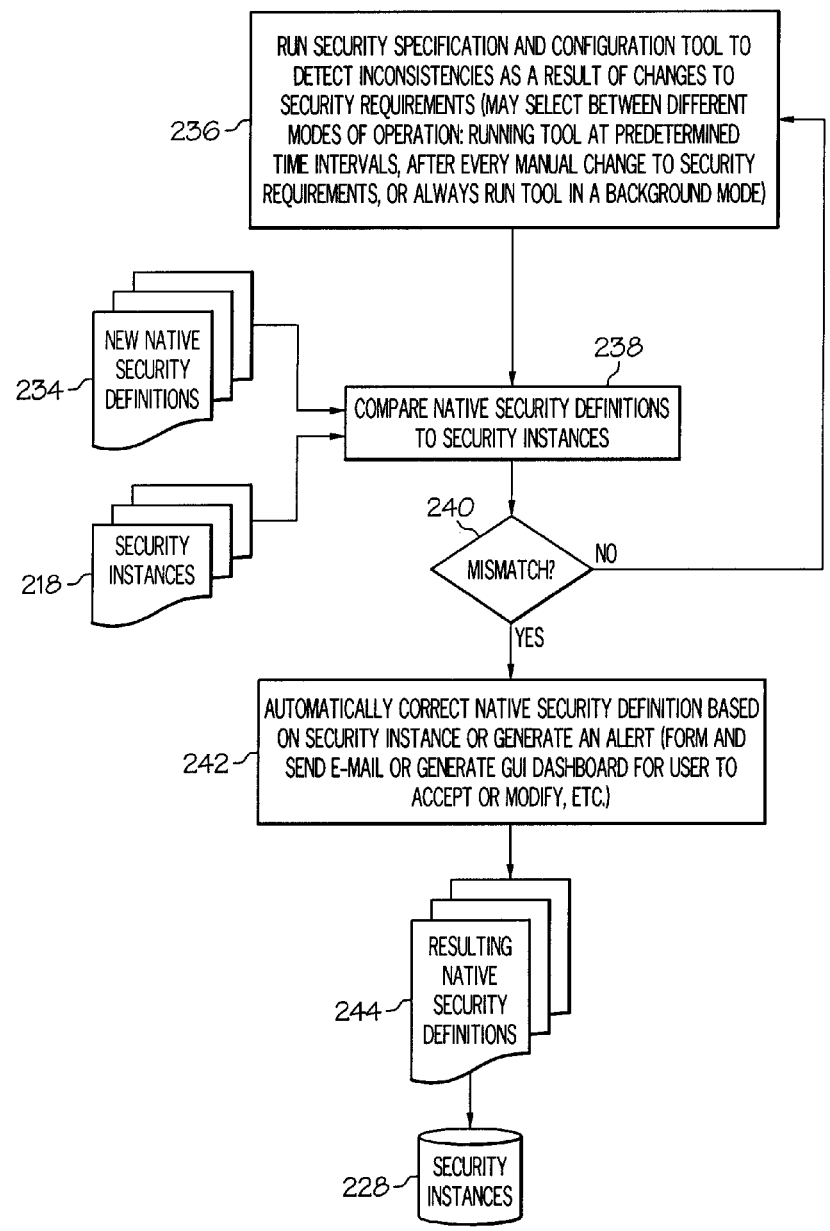

FIGS. 2A, 2B and 2C are a flow chart of an example of a method 200 for autonomic security configuration in accordance with another embodiment of the present invention. In block 202, a security specification and configuration tool may be run or accessed. The tool may reside on a web server or the like and may be accessed via a browser on a client computer system or the like. In block 204, a GUI may be presented to a user for defining a solution for a problem or to perform an operation. In block 206, each resource forming the solution may be selected or defined. Resources forming the solution may also be defined in the GUI. The solution and resources may be defined by entering information or data into a field or selecting predefined choices from a menu or drop-down list.

Figure 3:
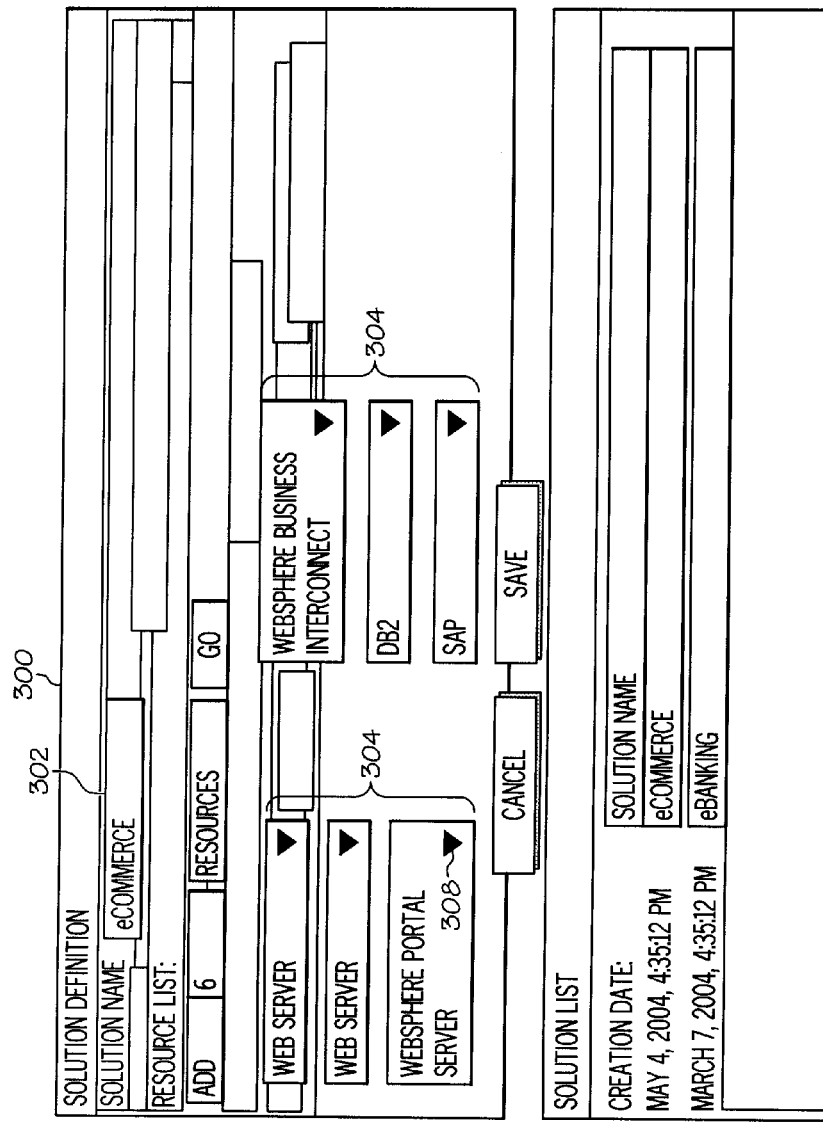
FIG. 3 is an example of a graphical user interface (GUI) to define a solution and resources to solve a problem or perform an operation in accordance with an embodiment of the present invention.

Referring also to FIG. 3, FIG. 3 is an example of a GUI 300 to define a solution and resources to solve a problem or perform an operation in accordance with an embodiment of the present invention. The GUI 300 may include a field 302 to define a name for the solution. The GUI 300 may also include fields 304 to define different resources that may form the solution. As indicated in GUI 300, the different resources may be selected from drop-down lists that may be displayed by "clicking-on" or operating an arrow 308 associated with each resource field 304. The arrow 308 may be "clicked-on" or operated by using a computer pointing device, such as a mouse or the like.

Returning to FIG. 2A, in block 208, a GUI may be presented to define security requirements for the solution based a predefined template. The user may select a template from a set 210 of templates. Each of the templates may have a multi-layered structure to facilitate ease of specifying the template and configuring the resources. Each template may have a Process Security Layer or Level, a Message Security Layer or Level and a Transport Security Layer or Level. The Process Security, Message Security, and Transport Security templates or template portions may be applied in a predetermined order or top-down fashion in the order listed with constraints enforced in the same order. At a top level or solution level, the Process Security template may define the default security settings for the next two levels or layers below, i.e. the Message Security Layer and Transport Security Layer when no specific templates are being applied for these two layers. If a template is applied at the Message Layer, it will dictate the security at the Transport Layer as well. In addition, each lower layer or level can only be more restrictive than the level above it and not less. Specifying or defining security requirements for each layer or level will be discussed in more detail below with reference to FIGS. 4-7. A listing of an example of a computer program of an extensible markup language (XML) schema for a security template in accordance with an embodiment of the present invention is contained in Table 3 at the end of this Detailed Description.

In block 212, a GUI to define security requirements for each resource forming the solution may be presented in response to the predefined template and security defined in the selected template for the solution. The GUI for defining security requirements for each resource may be similar to the GUI for defining security requirements for the solution.

In block 214, security requirements defined in or entered into the templates may be converted to data or security instances conforming to specific security technologies to provide a desired level of security and interoperability. As previously discussed, the different resources that form a solution may be diverse, from different vendors and may involve different security technologies. Because each security template may be a set of high level abstractions of commonly used collections of security requirements, each template may be easily converted by known tools to produce data conforming to other specific technologies, such as Web Services Security, Java 2 Platform, Enterprise Edition (J2EE) Security and the like. J2EE is a trademark of Sun Microsystems, Inc. in the United States, other countries, or both. Resource-specific plug-ins or the like may be associated with the security specification and configuration tool of the present invention to convert the security requirements defined in the template or templates into a security technology specific to each resource. Accordingly, the plurality of security requirements defined in the templates may be applied across all resources forming the solution in a resource-independent manner or independent of any differences in configuring resource security between the diverse resources.

Table 1 contains an example of a computer program listing that may be used for mapping or converting security requirements defined in a template to a specific resource technology or security instance 218 for configuring resource security in a method and system for autonomic security configuration in accordance with an embodiment of the present invention.

TABLE 1

"Confidentiality (at message layer)" mapped to <xenc:EncryptedData...>
"Data Integrity (at message layer)" mapped to <ds:KeyInfo...>
"Authentication":
  a) "basicAauth" mapped to
    <wsse:UsernameToken Id="Id__1019741546718">
    <wsse:Username>rod</wsse:Username>
    <wsse:Password>rod</wsse:Password>
      </wsse:UsernameToken></wsse:Security>
  b) "PKIAauth" mapped to
    <wsse:BinarySecurityToken... >

Referring back to FIG. 2A, in block 216, the security instances 218 formed in block 214 may be stored in a database 220. The security instances may be in the form of an Extensible Mark-up Language (XML) document or the like. Table 2 includes an example of an instance document for a method and system for autonomic security configuration in accordance with an embodiment of the present invention.

TABLE 2

<?xml version = "1.0" encoding = "utf-8"?>
<solution xmlns = "urn:ibmbpm-com:sec_v1" xmlns:xsi =
"http://www.w3.org/2001/XMLSchema-instance" xsi:schemaLocation = "urn:ibmbpm-
com:sec_v1 file:///E:/gcb/BPM/BPMSecurityServiceNew.xsd">

TABLE 2-continued

```
<securitySpec xmlns:ibmbpm = "urn:ibmbpm-com:sec_v1" securitySpecId =
"httpsBasicAuth">
    <processSecurity xmlns:ibmbpm = "urn:ibmbpm-com:sec_v1">
        <qualityOfProtection xmlns:ibmbpm = "urn:ibmbpm-com:sec_v1"
encryptionStrength = "medium">
            <confidentiality xmlns:ibmbpm = "urn:ibmbpm-com:sec_v1"
messageLevel = "no" transportLevel = "yes"/>
            <dataIntegrity xmlns:ibmbpm = "urn:ibmbpm-com:sec_v1"
messageLevel = "no" transportLevel = "yes"/>
            <nonrepudiation xmlns:ibmbpm = "urn:ibmbpm-
com:sec_v1" proofOfOrigin = "no" proofOfDelivery = "no"/>
        </qualityOfProtection>
    </processSecurity>
    <messageSecurity xmlns:ibmbpm = "urn:ibmbpm-com:sec_v1"
securityProtocol = "none"/>
    <transportSecurity xmlns:ibmbpm = "urn:ibmbpm-com:sec_v1"
endpointProtocol = "https" transportConfidentiality = "https" transportEncryption = "https">
        <transportAuth xmlns:ibmbpm = "urn:ibmbpm-com:sec_v1"
trasportAuthMethod = "basicAuth" trasportAuthMechanism = "localOS"/>
    </transportSecurity>
</securitySpec>
<resource xmlns:ibmbpm = "urn:ibmbpm-com:sec_v1" resourceId =
"PurchaseOrderApp">
</resource>
</solution>
```

In block 222, native security definitions may be generated for each resource. The plug-in components from each vendor or provider, as discussed above, may generate each native security definition based on a corresponding security instance 218. In block 224, the native security definitions 226 may be saved in a database 228.

In block 230, the security configuration for individual resources may be modified over time by administrative personnel or the like for various reasons. For example, an update or later version of a resource may result in a change to the security configuration and security definitions for a resource. In block 232, the new or modified security definitions 234 may be saved in the database 228.

In block 236, the security specification and configuration tool may be run to detect inconsistencies as a result of changes to security requirements or native security definitions. The tool may be run on a continuous basis in the background or periodically to monitor a current configuration of the resources forming the solution. The tool may be run at predetermined time intervals or after every manual change to security requirements or changes to resources. In one embodiment of the present invention, the user may select the mode of operation for monitoring the security configuration.

As a part of monitoring the security configuration for the solution and resources and detecting any inconsistencies, native security definitions may be compared to security instances in block 238. In block 240, a determination may be made whether there is any mismatch. If there is no mismatch, the method 200 may return to block 236 and the method may continue as previously described. If a mismatch or inconsistency is detected, the method 200 may advance to block 242. In block 242, the native security definition may be automatically corrected or an alert may be generated and sent to the user. The alert may be automatically generated and sent as an e-mail message or a GUI may be generated for a user to accept or modify the inconsistency. The GUI may also present an option for the user to select automatic correction of the native security definition to remove the inconsistency. The corrected or resulting native security definitions 244 may be returned to the native security definitions database 228.

Figure 4:
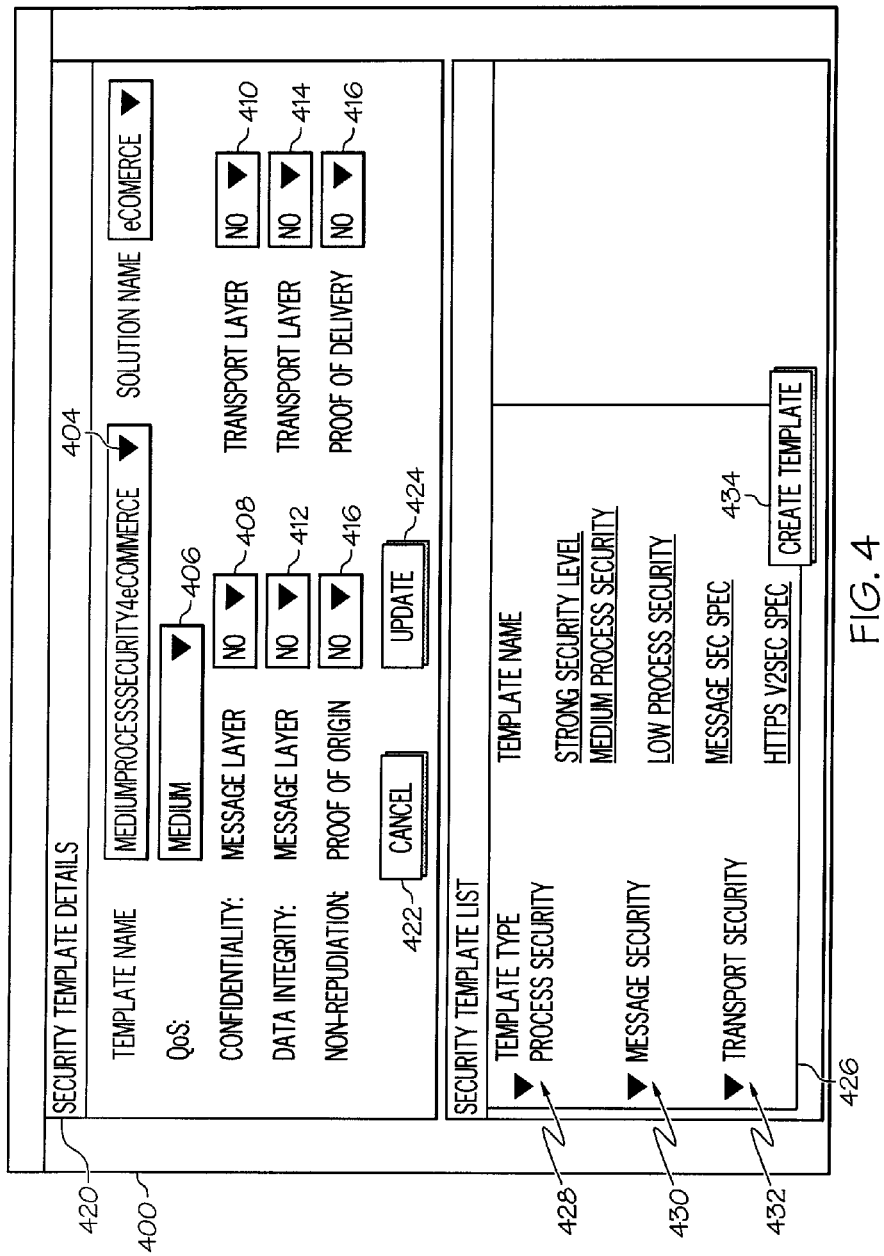
FIG. 4 is an example of a GUI to define or customize security requirements for a template in accordance with an embodiment of the present invention.

Referring to FIG. 4, FIG. 4 is an example of a GUI 400 to define or customize security requirements for a template in accordance with an embodiment of the present invention. GUI 400 is an example of the GUI that may be presented in blocks 208 and 212 of FIG. 2 to define security requirements for a solution and its resources using a selected template. In field or box 402, a template name may be defined. As used herein, "defining" or "defined" may mean entering a term or selecting an option from a drop-down list or menu that may be displayed by "clicking-on" or operating an arrow or other symbol or icon associated with a box or field using a computer pointing device or mouse, as is known in the computer or data processing industries. As an example, the template name in box 402 may be defined by selecting from a drop-down list or menu that may be displayed in response to "clicking-on" or activating an arrow 404 associated with box 402.

Figure 5:
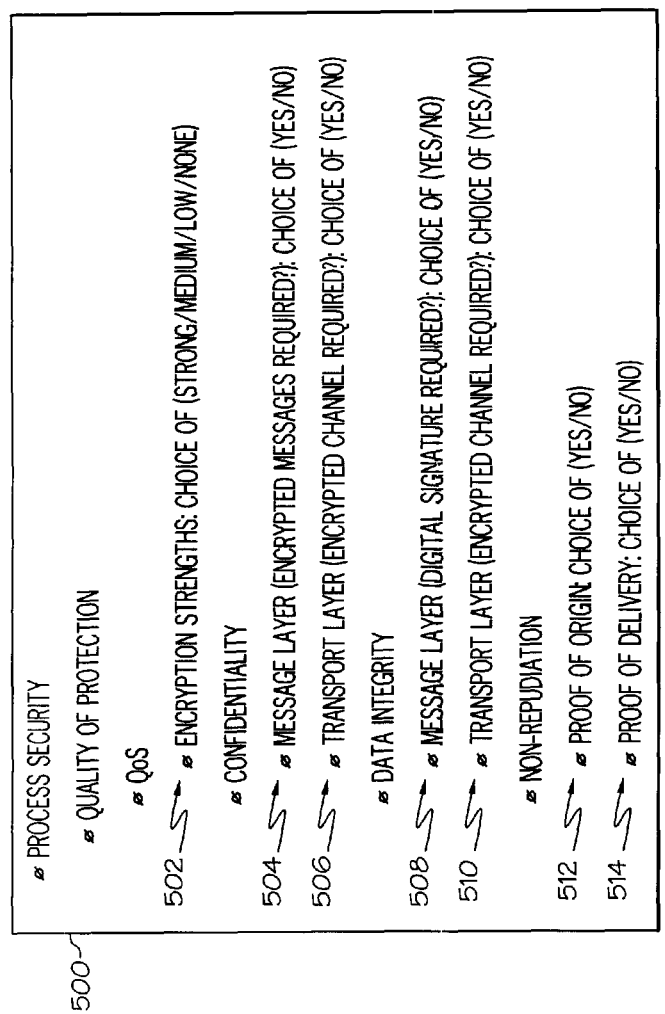
FIG. 5 is a representation of an example of a process security layer of a template and the different security options that may be defined in a method and system for autonomic security configuration in accordance with an embodiment of the present invention.

In box or field 406, a quality of service (QoS) may be defined by selecting or entering an option. Referring also to FIG. 5 along with FIG. 4, FIG. 5 is a representation of an example of a process security layer 500 of a template and illustrates the different security options that may be specified in a method and system for autonomic security configuration in accordance with an embodiment of the present invention. As indicated in the process security layer representation 500 of FIG. 5, QoS may be defined by choosing an encryption strength. Examples of choices of encryption strength that may be selected in block 406 (FIG. 4) may include "strong," "medium," "low" and "none." An example of varying encryption strength may be provided by the public key length used in the Secure Sockets Layer/Transport Layer Security (SSL/TLS) encryption mechanism which is used for Hypertext Transport Protocol (HTTP) based requests. A "strong" encryption strength may be mapped to a public key length of 1024 bits. A "medium" encryption strength may be mapped to a key length of 512 bits. A "low" encryption strength may be mapped to a key length of 128 bits. An encryption strength of "none" would correspond to a plain HTTP request that is not encrypted using SSL/TLS.

In box or field 408 of FIG. 4 confidentiality for the message layer of the template may be defined and in box 410 confidentiality for the transport layer may be defined. As illustrated in the process security layer representation 500 of FIG. 5, confidentiality for the message layer 504 may be a choice of "Yes" or "No" whether encrypted messages are required, and confidentiality for the transport layer 506 may be a choice of "Yes" or "No" whether an encrypted channel is required.

Data integrity for the message layer and transport layer may be defined in box 412 and box 414 of GUI 400 (FIG. 4), respectively. In the process security layer representation 500 of the template in FIG. 5, data integrity for the message layer 508 may be a choice of "Yes" or "No" for whether a digital signature in required. Data integrity for the transport layer 510 may be a choice of "Yes" or "No" for whether an encrypted channel is required.

In the security template GUI 400 (FIG. 4), non-repudiation may be defined by selecting an option for proof of origin in box 416 and proof of delivery in box 418. As illustrated in the process security layer representation 500 of FIG. 5 proof of origin 512 and proof of delivery 514 may each be a choice of "Yes" or "No."

The options specified in an upper portion 420 of GUI 400 may be canceled by operating a "Cancel" button 422 or the like, or may be updated and saved as part of the template by operating an "Update" button 424 or the like.

A security template list may be displayed in a lower portion 426 of GUI 400. The security template list may present the current security configuration specified for the process security layer 428, message security layer 430 and transport security layer 432. A drop-down list or menu may be presented for each layer to specify a different security template or configuration.

The template specified by the entries or selections in GUI 400 may be created by operating a button 434 that may be labeled "Create Template" or other descriptive label. The template may then be saved in a database for application to a solution.

Figure 6:
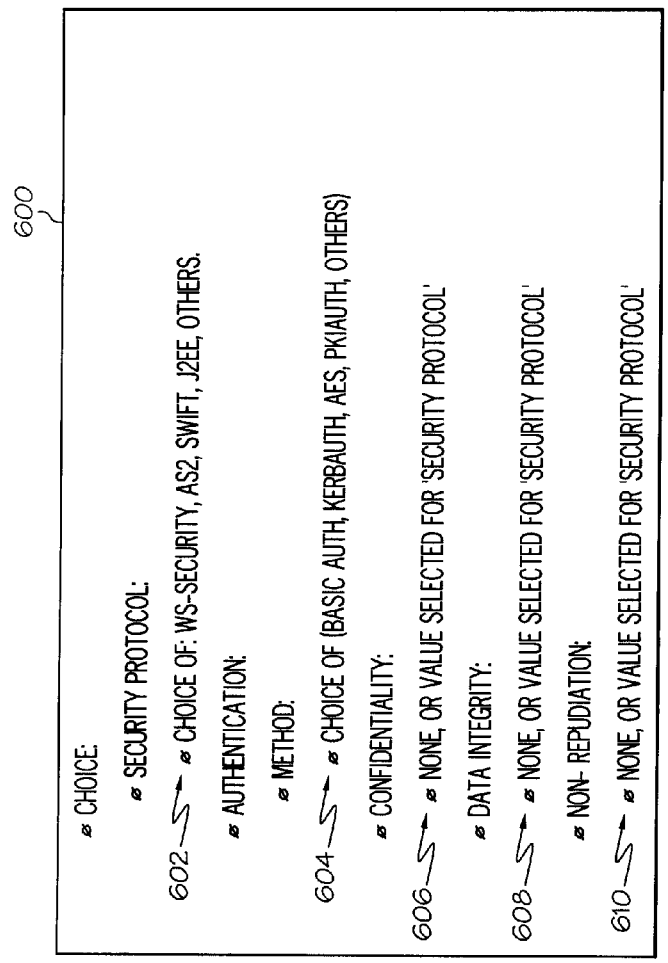
FIG. 6 is a representation of an example of a message security layer of a template and the different security options that may be defined in a method and system for autonomic security configuration in accordance with an embodiment of the present invention.

FIG. 6 is a representation of an example of a message security layer 600 of a template and the different security options that may be specified in a method and system for autonomic security configuration in accordance with an embodiment of the present invention. A GUI, similar to GUI 400, may be presented for a user to select the different options for the message security layer 600. Examples of the different elements for the message layer 600 for which options may be specified may include a choice of security protocol 602, choice of authentication method 604, confidentiality 606, data integrity 608 and non-repudiation 610. Examples of different choices of security protocol may include Web Server-Security (WS-Security), Authentication Server 2 (AS2), Society for Worldwide Interbank Financial Telecommunications (SWIFT), Java 2 Platform Enterprise Edition (J2EE™) or similar protocols. Java and J2EE are trademarks of Sun Microsystems, Inc. in the United States, other countries or both.

Examples of different choices of authentication methods or protocols in message security layer 600 may include Basic Auth, KerbAuth, Advanced Encryption Standard (AES), Public Key Infrastructure Authentication (PKIAuth) and the like. Options for confidentiality 606, data integrity 608 and non-repudiation 610 in the message layer 600 may each be none or a value selected for consistency with the security protocol selected.

Figure 7:
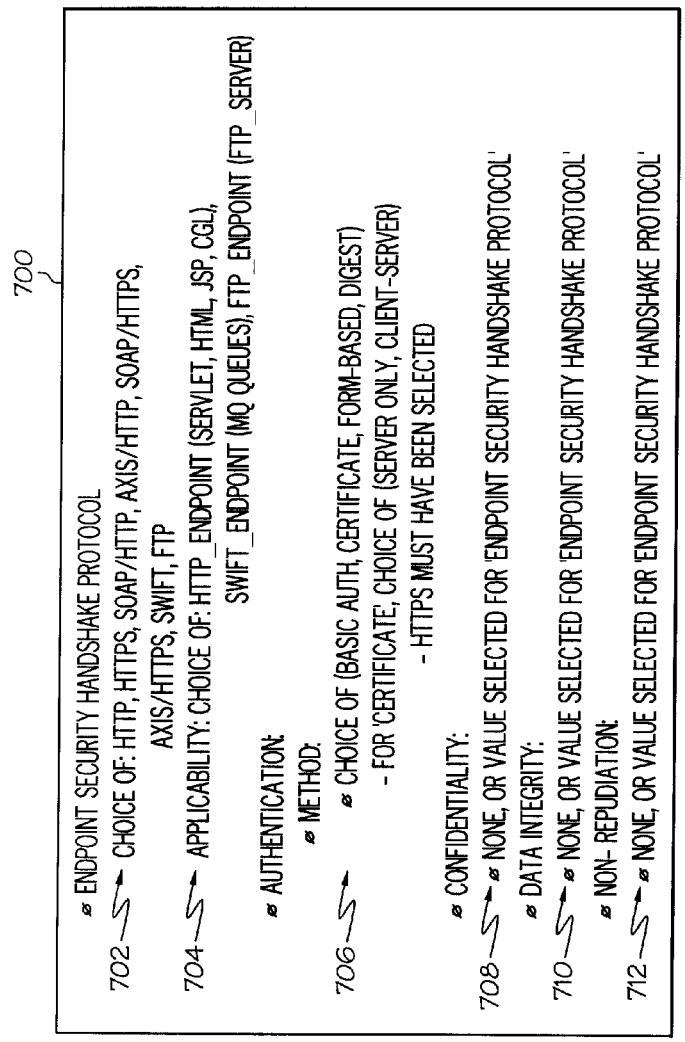
FIG. 7 is a representation of an example of a transport security layer of a template and the different security options that may be defined in a method and system for autonomic security configuration in accordance with an embodiment of the present invention.

FIG. 7 is a representation of an example of a transport security layer 700 of a template and the different security options that may be specified in a method and system for autonomic security configuration in accordance with an embodiment of the present invention. A GUI, similar to GUI 400, may be presented for a user to select the different options for the transport security layer 700. Examples of the different elements for the transport security layer 700 for which options may be specified may include a choice of Endpoint Security Handshake Protocol 702 and applicability 704, choice of authentication method or protocol 706, confidentiality 708, data integrity 710 and non-repudiation 712. Examples of the different Endpoint Security Handshake Protocols that may be specified or selected may include Hypertext Transfer Protocol (HTTP), Hypertext Transfer Protocol Secure (HTTPS), Simple Object Access Protocol (SOAP/HTTP), SOAP/HTTPS, AXIS/HTTPS, SWIFT, File Transfer Protocol (FTP) and similar protocols. Axis is an open source implementation of the SOAP provided by the Apache Software Foundation, Forest Hill, Md. A choice of applicability may also be specified. Examples of different applicability options may include HTTP_Endpoint (servlet, html (hypertext mark-up language), JSP (Java Server Page), CGI (Common Gateway Interface), etc.), SWIFT_Endpoint (MQ queues) FTP_Endpoint (FTP_Server) or similar applications.

Examples of different authentication options 706 may include Basic Authentication, Certificate, form-based, Digest, or the like. Digest authentication uses a cryptographic one way hash algorithm on the client to scramble the user ID and password before it is transmitted to the server during the authentication process. This causes the use ID and password to not be transmitted in clear text, as may be the case for Basic Authentication. For the certificate authentication method, additional options that may be defined may include server only or client-server certificate authentication. HTTPS may also be selected for consistency with this option. The options for confidentiality 708, data integrity and non-repudiation may each be none or a value selected consistent with the Endpoint Security Handshake Protocol.

Figure 8:
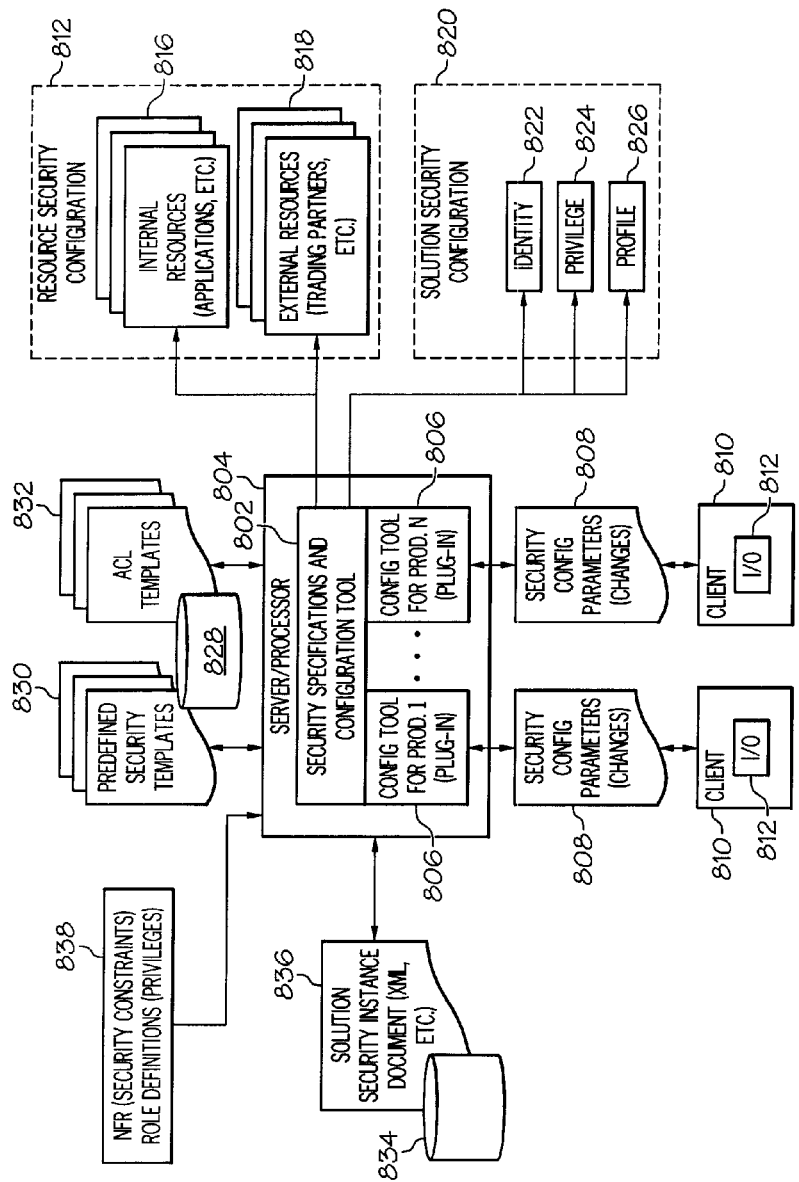
FIG. 8 is a block diagram of an exemplary system for autonomic security configuration in accordance with an embodiment of the present invention.

FIG. 8 is a block diagram of an exemplary system 800 for autonomic security configuration in accordance with an embodiment of the present invention. The system 800 may include a security specification and configuration tool 802 that may run or operate on a server or processor 804. The methods 100 and 200 of FIGS. 1 and 2 and the computer program listings of Tables 1, 2 and 3 may be embodied in the security specification and configuration tool 802. A resource-specific plug-in configuration tool 806 corresponding to each resource forming a solution may be associated with the security specification and configuration tool 802. The plug-in configuration tools 806 may perform the functions described with respect to blocks 214 and 222 of FIG. 2. The plug-in tools 806 may receive security configuration parameters 808 or security requirements from clients 810. Each of clients 810 may be a desktop computer system, mobile computing device, such as a laptop, personal digital assistant or other computing device that may access the security specification and configuration tool 802. Each client 810 may include input/output (I/O) devices 812. Examples of I/O devices 812 may include a keyboard or keypad, monitor or display, pointing device, disk drives, printer or the like. The I/O devices 812 permit a user to interface with the security specification and configuration tool 802, to display the GUIs, such as GUIs 300 and 600 of FIGS. 3 and 6, for defining the solution and resources and for defining security requirements for the solution and resources.

As previously discussed, the security specification and configuration tool 802 may facilitate controlling the resource security configuration 814 of a solution and all resources that may form the solution. This may include internal resources 816, such as applications and the like, and external resources 818, such as external trading partners or other external resources.

The security specification and configuration tool 802 may also facilitate controlling a solution security configuration 820. Controlling the solution security configuration may involve configuring security elements for user identity 822, user privileges 824 and user profiles 826 to determine proper access to the solution.

The system 800 may also include a database 828 for storing the predefined security templates 830 and Access Control List (ACL) templates 832. The ACL templates 832 may define security requirements for authorization and authentication for individuals and entities to access the solution. The ACL templates 832 may operate in conjunction with the identity 822, privilege 824 and profile 826 elements or features of the solution security configuration 820.

The system 800 may also include another database 834 for storing security instance documents 836. The security instance database 834 may be similar to the database 220 of FIG. 2. As previously discussed, the security instance documents may be XML documents or similar markup type language documents.

The security specification and configuration tool 802 may also receive as inputs nonfunctional requirements or security constraints and role definitions or privileges 838 that may be used to define and control the security configuration of a solution and resources forming the solution.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

TABLE 3

```
<?xml version = "1.0" encoding = "UTF-8"?>
<!--Generated by Turbo XML 2.3.1.100. Conforms to w3c
http://www.w3.org/2001/XMLSchema-->
<schema xmlns = "http://www.w3.org/2001/XMLSchema"
    targetNamespace = "http://www.ibm.com/2002/11/business-
process/security/SolutionSecurityTemplate/"
    xmlns:ibmbpm = "http://www.ibm.com/2002/11/business-
process/security/SolutionSecurityTemplate/
"   xmlns:xsd = "http://www.w3.org/2001/XMLSchema"
    version = "1.0"
    elementFormDefault = "qualified"
    attributeFormDefault = "unqualified"
    id = "ibmbpm">
  <xsd:import namespace="urn:bops-org"
      schemaLocation="bops.xsd"/>
    <element name = "processSecurity">
      <complexType>
        <sequence>
          <element ref = "ibmbpm:qualityOfProtection"/>
        </sequence>
      </complexType>
    </element>
    <element name = "messageSecurity" type = "ibmbpm:messageSecurity"/>
    <element name = "transportSecurity" type = "ibmbpm:transportSecurity"/>
    <element name = "qualityOfProtection" type = "ibmbpm:qualityOfProtection"/>
    <element name = "confidentiality" type = "ibmbpm:confidentiality"/>
    <element name = "dataIntegrity" type = "ibmbpm:dataIntegrity"/>
    <element name = "messageAuth" type = "ibmbpm:messageAuth"/>
    <element name = "solution" type = "ibmbpm:solution"/>
    <complexType name = "solution">
      <sequence>
        <element ref = "ibmbpm:securitySpec"/>
        <element ref = "ibmbpm:resource" maxOccurs = "unbounded"/>
      </sequence>
    </complexType>
    <element name = "resource" type = "ibmbpm:resource"/>
    <simpleType name = "messageAuthMethod">
      <restriction base = "NMTOKEN">
        <enumeration value = "basicAuth"/>
        <enumeration value = "kerbAuth"/>
```

TABLE 3-continued

```
            <enumeration value = "pki"/>
            <enumeration value = "3des"/>
            <enumeration value = "AES"/>
            <enumeration value = "none"/>
         </restriction>
      </simpleType>
      <simpleType name = "messageAuthMechanism">
         <restriction base = "NMTOKEN">
            <enumeration value = "localOS"/>
            <enumeration value = "LTPA"/>
            <enumeration value = "KerberosTk"/>
            <enumeration value = "none"/>
         </restriction>
      </simpleType>
      <simpleType name = "securityProtocol">
         <restriction base = "NMTOKEN">
            <enumeration value = "wsSecurity"/>
            <enumeration value = "as2"/>
            <enumeration value = "swift"/>
            <enumeration value = "j2ee"/>
            <enumeration value = "none"/>
         </restriction>
      </simpleType>
      <simpleType name = "encryptionStrength">
         <restriction base = "NMTOKEN">
            <enumeration value = "strong"/>
            <enumeration value = "medium"/>
            <enumeration value = "low"/>
            <enumeration value = "none"/>
         </restriction>
      </simpleType>
      <simpleType name = "messageLevel">
         <restriction base = "NMTOKEN">
            <enumeration value = "yes"/>
            <enumeration value = "no"/>
         </restriction>
      </simpleType>
      <simpleType name = "transportLevel">
         <restriction base = "NMTOKEN">
            <enumeration value = "yes"/>
            <enumeration value = "no"/>
         </restriction>
      </simpleType>
      <simpleType name = "proofOfOrigin">
         <restriction base = "NMTOKEN">
            <enumeration value = "yes"/>
            <enumeration value = "no"/>
         </restriction>
      </simpleType>
      <simpleType name = "proofOfDelivery">
         <restriction base = "NMTOKEN">
            <enumeration value = "yes"/>
            <enumeration value = "no"/>
         </restriction>
      </simpleType>
      <simpleType name = "messageConfidentiality">
         <restriction base = "NMTOKEN">
            <enumeration value = "wsSecurity"/>
            <enumeration value = "as2"/>
            <enumeration value = "swift"/>
            <enumeration value = "j2ee"/>
            <enumeration value = "none"/>
         </restriction>
      </simpleType>
      <simpleType name = "messageEncryption">
         <restriction base = "NMTOKEN">
            <enumeration value = "wsSecurity"/>
            <enumeration value = "as2"/>
            <enumeration value = "swift"/>
            <enumeration value = "j2ee"/>
            <enumeration value = "none"/>
         </restriction>
      </simpleType>
      <simpleType name = "trasportAuthMethod">
         <restriction base = "NMTOKEN">
            <enumeration value = "basicAuth"/>
            <enumeration value = "certificate"/>
            <enumeration value = "form"/>
```

TABLE 3-continued

```
        <enumeration value = "digest"/>
        <enumeration value = "none"/>
      </restriction>
    </simpleType>
    <simpleType name = "trasportAuthMechanism">
      <restriction base = "NMTOKEN">
        <enumeration value = "localOS"/>
        <enumeration value = "LTPA"/>
        <enumeration value = "none"/>
      </restriction>
    </simpleType>
    <simpleType name = "endpointProtocol">
      <restriction base = "NMTOKEN">
        <enumeration value = "http"/>
        <enumeration value = "https"/>
        <enumeration value = "soapHttp"/>
        <enumeration value = "axisHttp"/>
        <enumeration value = "saopHttps"/>
        <enumeration value = "axisHttps"/>
        <enumeration value = "swift"/>
        <enumeration value = "ftp"/>
      </restriction>
    </simpleType>
    <simpleType name = "transportEncryption">
      <restriction base = "NMTOKEN">
        <enumeration value = "https"/>
        <enumeration value = "saopHttps"/>
        <enumeration value = "axisHttps"/>
        <enumeration value = "swift"/>
        <enumeration value = "none"/>
      </restriction>
    </simpleType>
    <simpleType name = "transportConfidentiality">
      <restriction base = "NMTOKEN">
        <enumeration value = "https"/>
        <enumeration value = "saopHttps"/>
        <enumeration value = "axisHttps"/>
        <enumeration value = "swift"/>
        <enumeration value = "none"/>
      </restriction>
    </simpleType>
    <simpleType name = "endpointApplicability">
      <restriction base = "decimal"/>
    </simpleType>
    <simpleType name = "securityId">
      <restriction base = "string"/>
    </simpleType>
    <simpleType name = "securitySpecId">
      <restriction base = "string"/>
    </simpleType>
    <complexType name = "messageAuth">
      <attribute name = "messageAuthMechanism" use = "required" type = "ibmbpm:messageAuthMechanism"/>
      <attribute name = "messageAuthMethod" use = "required" type = "ibmbpm:messageAuthMethod"/>
    </complexType>
    <complexType name = "confidentiality">
      <attribute name = "messageLevel" use = "required" type = "ibmbpm:messageLevel"/>
      <attribute name = "transportLevel" type = "ibmbpm:transportLevel"/>
    </complexType>
    <complexType name = "dataIntegrity">
      <attribute name = "messageLevel" use = "required" type = "ibmbpm:messageLevel"/>
      <attribute name = "transportLevel" type = "ibmbpm:transportLevel"/>
    </complexType>
    <complexType name = "messageSecurity">
      <sequence>
        <element ref = "ibmbpm:messageAuth" minOccurs = "0"/>
      </sequence>
      <attribute name = "securityProtocol" type = "ibmbpm:securityProtocol"/>
      <attribute name = "messageConfidentiality" type = "ibmbpm:messageConfidentiality"/>
      <attribute name = "messageEncryption" type = "ibmbpm:messageEncryption"/>
    </complexType>
    <complexType name = "qualityOfProtection">
      <sequence>
```

TABLE 3-continued

```
            <element ref = "ibmbpm:confidentiality"/>
            <element ref = "ibmbpm:dataIntegrity"/>
            <element ref = "ibmbpm:nonrepudiation"/>
        </sequence>
        <attribute name = "encryptionStrength" use = "required" type =
"ibmbpm:encryptionStrength"/>
    </complexType>
    <element name = "nonrepudiation" type = "ibmbpm:nonrepudiation"/>
    <complexType name = "nonrepudiation">
        <attribute name = "proofOfOrigin" type = "ibmbpm:proofOfOrigin"/>
        <attribute name = "proofOfDelivery" type = "ibmbpm:proofOfDelivery"/>
    </complexType>
    <complexType name = "transportSecurity">
        <sequence>
            <element ref = "ibmbpm:transportAuth"/>
        </sequence>
        <attribute name = "endpointProtocol" use = "required" type =
"ibmbpm:endpointProtocol"/>
        <attribute name = "transportConfidentiality" type =
"ibmbpm:transportConfidentiality"/>
        <attribute name = "transportEncryption" type =
"ibmbpm:transportEncryption"/>
    </complexType>
    <element name = "transportAuth" type = "ibmbpm:transportAuth"/>
    <complexType name = "transportAuth">
        <attribute name = "trasportAuthMethod" use = "required" type =
"ibmbpm:trasportAuthMethod"/>
        <attribute name = "trasportAuthMechanism" use = "required" type =
"ibmbpm:trasportAuthMechanism"/>
    </complexType>
    <complexType name = "resource">
        <sequence>
            <element ref = "ibmbpm:securitySpec" minOccurs = "0"/>
        </sequence>
        <attribute name = "resourceId" use = "required" type = "string"/>
    </complexType>
    <element name = "securitySpec" type = "ibmbpm:securitySpec"/>
    <complexType name = "securitySpec">
        <sequence>
            <element ref = "ibmbpm:processSecurity"/>
            <element ref = "ibmbpm:messageSecurity"/>
            <element ref = "ibmbpm:transportSecurity"/>
        </sequence>
        <attribute name = "securitySpecId" type = "string"/>
    </complexType>
</schema>
```

What is claimed is:

1. A method executable on a processor for autonomic security configuration, comprising:

controlling by the processor a security configuration of at least one resource forming a solution based on a plurality of security requirements;

applying by the processor the plurality of security requirements across a plurality of resources independent of any differences in configuring resource security between the plurality of resources; and providing a set of templates by the processor for selection by a user, each template comprising a collection of security requirements, each template having a multi-layered structure comprising a process security layer, a message security layer and a transport security layer applied in a top-down fashion where each lower level security layer includes specifications more restrictive than specifications in a security layer at a level above, wherein the process security layer defines default security settings for the message security layer and the transport security layer when the message security layer and the transport security layer are not applied, and the message security layer defines default security settings for the transport security layer when the transport security layer is not applied.

2. The method of claim 1, further comprising configuring by the processor the at least one resource to comply with the plurality of security requirements.

3. The method of claim 1, further comprising generating by the processor a graphical user interface (GUI) for entering the plurality of security requirements, wherein the security requirements comprise authentication, authorization, non-repudiation, confidentiality and data integrity options.

4. The method of claim 1, further comprising:

monitoring by the processor a current configuration of the at least one resource on one of a continuous and a periodic basis; and generating by the processor an alert in response to the current configuration of the at least one resource being inconsistent with an overall solution security configuration.

5. The method of claim 1, further comprising:

monitoring by the processor a current configuration of the at least one resource on one of a continuous and a periodic basis; and automatically reconfiguring the at least one resource by the processor to be consistent with an overall solution security configuration in response to the at least one resource being inconsistent with the overall solution security configuration.

6. The method of claim 1, further comprising:
facilitating customization of a selected template to meet currently desired security requirements.

7. A system for autonomic security configuration, comprising:
a hardware processor; and
a security specification and configuration tool executed by the hardware processor to control security configuration of at least one resource forming a solution based on a plurality of security requirements, to apply the plurality of security requirements across a plurality of resources independent of any differences in configuring resource security between the plurality of resources, to monitor a current configuration of the at least one resource, and to provide a set of templates for selection by a user, each template comprising a collection of security requirements, each template having a multi-layered structure comprising a process security layer, a message security layer and a transport security layer applied in a top-down fashion where each lower level security layer includes specifications more restrictive than specifications in a security layer at a level above,
wherein the process security layer defines default security settings for the message security layer and the transport security layer when the message security layer and the transport security layer are not applied, and the message security layer defines default security settings for the transport security layer when the transport security layer is not applied.

8. The system of claim 7, further comprising a plug-in associated with the at least one resource to configure the at least one resource to comply with the plurality of security requirements.

9. The system of claim 7, further comprising a GUI for entering the plurality of security requirements, wherein the security requirements comprise authentication, authorization, non-repudiation confidentiality and data integrity options.

10. The system of claim 7, wherein the security specification and configuration tool comprises a data structure to present a current security configuration of the at least one resource in response to a user request.

11. The system of claim 7, wherein the security specification and configuration tool comprises:
a data structure to monitor the current configuration of the at least one resource on one of a continuous and a periodic basis; and
a data structure to perform at least one of generating an alert in response to the current configuration of the at least one resource being inconsistent with the overall solution security configuration, and automatically reconfiguring the at least one resource to be consistent with the overall solution security configuration in response to the at least one resource being inconsistent with the overall solution security configuration.

12. A computer program product for autonomic security configuration, the computer program product comprising a non-transitory computer readable storage medium having computer readable program code embodied therein, the computer readable medium comprising:
computer readable program code configured to control a security configuration of at least one resource forming a solution based on a plurality of security requirements;
computer readable program code configured to apply the plurality of security requirements across a plurality of resources independent any differences in configuring resource security between the plurality of resources; and
computer readable program code configured to provide a set of templates for selection by a user, each template comprising a collection of security requirements, each template having a multi-layered structure comprising a process security layer, a message security layer and a transport security layer applied in a top-down fashion where each lower level security layer includes specifications more restrictive than specifications in a security layer at a level above,
wherein the process security layer defines default security settings for the message security layer and the transport security layer when the message security layer and the transport security layer are not applied, and the message security layer defines default security settings for the transport security layer when the transport security layer is not applied.

13. The computer program product of claim 12, further comprising computer readable program code configured to configure the at least one resource to comply with the plurality of security requirements.

14. The computer program product of claim 12, further comprising computer readable program code configured to generate a GUI for entering the plurality of security requirements, wherein the security requirements comprise authentication, authorization, non-repudiation, confidentiality and data integrity options.

15. The computer program product of claim 12, further comprising computer readable program code configured to present a current security configuration of the at least one resource in response to a user request.

16. The computer program product of claim 12, further comprising:
computer readable program code configured to monitor a current configuration of the at least one resource on one of a continuous and a periodic basis; and
computer readable program code configured to generate an alert in response to the current configuration of the at least one resource being inconsistent with the overall solution security configuration, and automatically reconfigure the at least one resource to be consistent with an overall solution security configuration in response to the at least one resource being inconsistent with the overall solution security configuration.

17. The computer program product of claim 12, further comprising:
computer readable program code configured to facilitate customization of a selected template to meet currently desired security requirements.

\* \* \* \* \*